US012766446B2

(12) United States Patent
Laakso

(10) Patent No.: US 12,766,446 B2
(45) Date of Patent: Oct. 20, 2026

(54) FILTER SECTOR ASSEMBLY OF A DISC FILTER

(71) Applicant: Valmet Technologies, Inc., Espoo (FI)

(72) Inventor: Janne Laakso, Tampere (FI)

(73) Assignee: Valmet Technologies, Inc., Espoo (FI)

(*) Notice: Subject to any disclaimer, the term of this patent is extended or adjusted under 35 U.S.C. 154(b) by 496 days.

(21) Appl. No.: 18/527,485

(22) Filed: Dec. 4, 2023

(65) Prior Publication Data

US 2024/0189745 A1 Jun. 13, 2024

(30) Foreign Application Priority Data

Dec. 9, 2022 (FI) ...................................... 20226090

(51) Int. Cl.
*B01D 33/15* (2006.01)

(52) U.S. Cl.
CPC ...... *B01D 33/15* (2013.01); *B01D 2201/0415* (2013.01); *B01D 2201/282* (2013.01)

(58) Field of Classification Search
None
See application file for complete search history.

(56) References Cited

U.S. PATENT DOCUMENTS 1,017,476 A * 2/1912 Singer .................... B01D 33/21 210/395
1,036,174 A * 8/1912 Barnes ................... B01D 33/23 210/331
1,057,475 A * 4/1913 Young .................... B01D 33/23 210/395
1,259,139 A * 3/1918 Salisbury ............... B01D 35/16 210/395
1,293,555 A * 2/1919 Salisbury ............... B01D 33/23 210/345
1,472,098 A * 10/1923 Sweetland ........... B01D 33/463 210/330
1,538,980 A * 5/1925 Legrand ................. B01D 33/23 210/216
1,649,581 A * 11/1927 Gentep .................. B01D 33/21 210/791
1,685,085 A * 9/1928 Hoyt ........................ D21C 9/18 210/406
1,685,118 A * 9/1928 Campbell .............. B01D 33/21 210/216

(Continued)

FOREIGN PATENT DOCUMENTS

DE 102007018054 A1 * 11/2007 ............. B01D 33/21
DE 102007018054 B4 * 1/2009 ........... B01D 33/803

(Continued)

*Primary Examiner* — Robert J Popovics
(74) *Attorney, Agent, or Firm* — Stiennon & Stiennon

(57) ABSTRACT

A filter sector assembly for a disc filter, which disc filter has a fiber suspension containing bath and a core assembly adapted to rotate on a horizontal axis. The filter sector assemblies are rotatably supported with relation to the bath on the core assembly. The filter sector assemblies are spaced along the core assembly and supported on the core assembly. Each filter sector assembly (50) has two adjacent filter sectors (10A; 10B) releasably fixed to a bent support plate (30). The two adjacent filter sectors (10A; 10B) are attached as a pair of filter sectors (10A; 10B) by fastening the support plate (30) to the core assembly (21; 21A, 21B) of the disc filter.

12 Claims, 2 Drawing Sheets

(56) References Cited

U.S. PATENT DOCUMENTS 1,746,409 A * 2/1930 Sweetland ............. B01D 33/82 210/486
1,757,355 A * 5/1930 Benjamin ............. B01D 33/82 210/396
1,774,044 A * 8/1930 Sweetland ............. B01D 33/72 210/780
1,804,934 A * 5/1931 Hoyt ...................... B01D 33/21 210/327
1,812,725 A * 6/1931 Stanley .................. B01D 29/39 140/109
1,848,445 A * 3/1932 Vallez .................... B01D 33/25 210/395
1,860,937 A * 5/1932 Mccaskell .............. B01D 33/23 210/230
2,022,069 A * 11/1935 Whitmore ............ B01D 33/466 210/784
2,076,104 A * 4/1937 Vinton ................. B01D 29/661 210/395
2,205,758 A * 6/1940 Clark ..................... B01D 33/23 52/666
2,207,618 A * 7/1940 Feldstein ............... B01D 33/21 210/93
2,338,549 A * 1/1944 Shriver .................. B01D 33/23 210/486
2,362,231 A * 11/1944 Ackerly, Jr. ........... B01D 33/23 210/485
2,395,225 A * 2/1946 Kurz ...................... B01D 33/60 210/486
2,460,280 A * 2/1949 Finney ................... B01D 33/23 210/393
2,464,223 A * 3/1949 Genter ................... B01D 33/23 210/395
2,591,720 A * 4/1952 Lynn ...................... B01D 33/23 210/345
2,696,916 A * 12/1954 Peterson ................ B01D 33/21 210/236
2,781,133 A * 2/1957 Thompson ............. B01D 33/58 210/395
2,864,503 A * 12/1958 Hunter ................. B01D 33/073 210/93
2,885,083 A * 5/1959 Lynn ...................... B01D 33/23 210/396
2,894,632 A * 7/1959 Myers .................... B01D 33/23 210/331
2,964,194 A * 12/1960 Oliver, Jr. .............. B01D 33/23 210/486
3,080,064 A * 3/1963 Giesse ................... B01D 33/82 210/330
3,096,278 A * 7/1963 Francom ................ B01D 33/21 210/396
3,193,105 A * 7/1965 Putnam ................ B01D 33/807 210/486
3,216,576 A * 11/1965 Roos ...................... B01D 35/16 210/488
3,250,396 A * 5/1966 Gayring ................. B01D 29/66 210/182
3,283,906 A * 11/1966 Crane .................... B01D 33/23 210/232
3,291,312 A * 12/1966 Lynn ...................... B01D 33/23 210/345
3,317,050 A * 5/1967 Daman .................. B01D 33/21 210/388
3,331,512 A * 7/1967 Vore ....................... B01D 33/23 210/487
3,363,770 A * 1/1968 Glos, II ................. B01D 33/23 210/345
3,369,668 A * 2/1968 Glos, II ............... B01D 39/083 210/345
3,398,833 A * 8/1968 Murray ............. B01D 63/0822 210/486
3,409,134 A * 11/1968 Wallace ................. B01D 33/48 210/780
3,438,505 A * 4/1969 Luthi ..................... B01D 33/23 210/486
3,471,026 A * 10/1969 Riker ................... B01D 33/463 210/334
3,473,669 A * 10/1969 Davis ..................... B01D 33/23 210/486
3,482,702 A * 12/1969 Edwards ................ B01D 29/39 210/406
3,485,376 A * 12/1969 Lynn ...................... B01D 33/23 210/486
3,491,886 A * 1/1970 Glos ...................... B01D 33/23 210/333.1
3,537,592 A * 11/1970 Ogden ................... B01D 25/26 210/345
3,539,050 A * 11/1970 Davis ..................... B01D 33/23 210/486
3,610,419 A * 10/1971 Vallee .................... B01D 33/23 210/326
3,643,803 A * 2/1972 Glos, II ................. B01D 33/23 210/232
3,659,716 A * 5/1972 Peterson ............. B01D 33/466 210/247
3,692,181 A * 9/1972 Davis ..................... B01D 33/23 210/486
3,724,668 A * 4/1973 Ahlquist ................ B01D 33/21 210/331
3,917,534 A * 11/1975 Moore ................... B01D 33/23 210/486
3,948,779 A * 4/1976 Jackson ................. B01D 33/23 210/331
3,960,729 A * 6/1976 Peterson ................ B01D 33/82 210/232
3,971,722 A * 7/1976 Radford ................. B01D 33/23 210/489
4,032,442 A * 6/1977 Peterson ................ B01D 33/23 210/411
4,075,103 A * 2/1978 Kane ...................... B01D 33/82 210/404
4,077,887 A * 3/1978 Langvik ................. B01D 33/23 210/486
4,086,168 A * 4/1978 Moore ................... B01D 33/76 220/23.9
4,123,363 A * 10/1978 Koskinen ............... B01D 33/21 210/331
4,139,472 A * 2/1979 Simonson .............. B01D 33/23 210/232
4,152,267 A * 5/1979 Davis ................... B01D 33/803 210/345
4,159,951 A * 7/1979 Davis ..................... B01D 33/23 210/345
4,162,982 A * 7/1979 Chesner ................. B01D 33/23 210/486
4,180,461 A * 12/1979 Langvik ................. B01D 33/82 210/345
4,190,544 A * 2/1980 Schnellmann ......... B01D 33/19 210/486
4,203,846 A * 5/1980 Barthelemy ........... B01D 33/23 210/486
4,207,190 A * 6/1980 Sheaffer ................. B01D 33/82 210/232
4,216,093 A * 8/1980 Kane .................... B01D 33/803 210/345
4,216,094 A * 8/1980 Solum .................... B01D 33/23 210/486
4,220,537 A * 9/1980 Takahashi .............. B01D 33/48 162/410
4,251,376 A * 2/1981 Badino .................. B01D 33/23 210/331
4,285,817 A * 8/1981 Barthelemy ........... B01D 33/23 210/455
4,321,140 A * 3/1982 Luthi ................... B01D 33/766 210/327
4,330,405 A * 5/1982 Davis ..................... B01D 33/23 210/486
4,362,622 A * 12/1982 Urquhart ................ B01D 33/23 210/486

(56) References Cited

U.S. PATENT DOCUMENTS 4,378,292 A * 3/1983 Haase .................... B01D 53/08 422/220
D270,857 S * 10/1983 Juutilainen .................. D23/209
4,578,192 A * 3/1986 Muller ................... B01D 39/14 210/486
4,634,529 A * 1/1987 Nilsson .................. B01D 33/74 210/486
4,637,876 A * 1/1987 Dosoudil ............... B01D 33/23 210/486
4,648,970 A * 3/1987 Hermansson ........ B01D 33/463 210/386
4,655,920 A * 4/1987 Ragnegard ............. B01D 33/23 210/345
4,676,901 A * 6/1987 Ragnegard ........... B01D 33/463 210/486
4,678,575 A * 7/1987 Frykhult ................ B01D 33/23 210/345
4,686,040 A * 8/1987 Nilsson .................. B01D 33/23 210/486
4,699,716 A * 10/1987 Barra ..................... B01D 33/23 210/486
4,856,204 A * 8/1989 Hindstrom ......... B01D 39/2075 34/95
4,863,656 A * 9/1989 Hindstrom ............. B01D 33/23 264/DIG. 48
4,865,732 A * 9/1989 Garrant .................. B01D 33/23 210/232
4,876,007 A * 10/1989 Naruo .................. B01D 63/084 210/488
4,889,625 A * 12/1989 Nilsson .................. B01D 33/15 210/333.01
4,923,605 A * 5/1990 Nilsson .................. B01D 33/23 210/232
4,925,557 A * 5/1990 Ahlberg, Jr. ........... B01D 33/23 210/321.68
4,931,179 A * 6/1990 Nilsson .................. B01D 33/23 210/404
4,956,088 A * 9/1990 Hindstrom ............. B01D 33/21 210/406
4,994,183 A * 2/1991 Nilsson .................. B01D 33/74 210/247
5,227,065 A * 7/1993 Strid ...................... B01D 33/23 210/404
5,238,564 A * 8/1993 Luthi ................... B01D 33/803 210/780
5,242,590 A * 9/1993 Thomson ............. B01D 33/803 210/486
5,258,120 A * 11/1993 Knodel .................. B01D 33/23 210/232
5,273,651 A * 12/1993 Nilsson .................. B01D 33/74 210/404
5,330,644 A * 7/1994 Nilsson .................. B01D 33/23 210/324
5,330,645 A * 7/1994 Geldmacher ........ B01D 33/727 210/396
5,540,846 A * 7/1996 Koch ..................... B01D 33/21 134/40
5,618,422 A * 4/1997 Pelkio .................... B01D 33/23 210/323.1
5,635,062 A * 6/1997 Cameron ............... B01D 33/23 210/232
5,641,402 A * 6/1997 Kohonen ............... B01D 33/21 210/330
5,647,982 A * 7/1997 Haythornthwaite ... B01D 33/23 210/486
5,705,068 A * 1/1998 Lukkarinen ............ B01D 33/72 210/456
5,707,512 A * 1/1998 Koch ..................... B01D 33/21 210/383
5,759,397 A * 6/1998 Larsson ................. B01D 33/21 210/402
5,766,466 A * 6/1998 Peterson ................ B01D 33/23 119/508
5,792,352 A * 8/1998 Scheucher ............. B01D 33/23 210/345
5,849,202 A * 12/1998 Koch ................... B01D 33/073 210/197
5,855,799 A * 1/1999 Herrmann .............. B01D 29/52 210/791
5,893,972 A * 4/1999 Peterson ................ B01D 33/23 210/497.3
D409,739 S * 5/1999 Hood ........................... D25/152
5,900,158 A * 5/1999 Ruokolainen .......... B01D 33/68 210/780
5,925,248 A * 7/1999 Moore ................... B01D 33/23 210/345
5,951,878 A * 9/1999 Astrom .................. B01D 33/21 210/197
6,010,014 A * 1/2000 Nilsson .................. B01D 33/23 210/486
6,063,294 A * 5/2000 Martensson ......... B01D 33/804 210/741
6,096,198 A * 8/2000 Underhill ........... B01D 17/0214 210/123
6,103,132 A * 8/2000 Seyfried ............. B01D 33/073 210/791
6,110,386 A * 8/2000 Underhill ........... B23Q 11/1069 261/119.1
6,113,783 A * 9/2000 Strid ...................... B01D 33/82 210/404
6,217,782 B1 * 4/2001 Tuori ..................... B01D 33/54 210/785
6,231,761 B1 * 5/2001 Mohlin .................. B01D 33/23 210/232
6,258,282 B1 * 7/2001 Strid .................... B01D 33/463 210/791
6,283,306 B1 * 9/2001 Nilsson .................. B01D 33/21 210/334
6,284,136 B1 * 9/2001 Tuori ................. B01D 29/6438 210/785
6,294,098 B1 * 9/2001 Bergmann ........... B01D 33/503 210/791
6,454,940 B1 * 9/2002 Walters .................. B01D 33/23 210/402
6,749,751 B1 * 6/2004 Strohm .................. B01D 29/41 210/232
6,833,077 B2 * 12/2004 Flanagan ............ B01D 33/804 210/392
7,005,067 B2 * 2/2006 Flanagan ............ B01D 33/466 210/396
7,314,556 B2 * 1/2008 Sheets .................... B01D 33/23 210/345
7,556,156 B2 * 7/2009 Lovizzaro ............. B01D 33/23 210/486
7,597,805 B2 * 10/2009 Danielsson ............ B01D 33/23 210/232
D606,621 S * 12/2009 Larsson ....................... D23/209
7,972,508 B2 * 7/2011 Danielsson ............ B01D 33/21 210/232
8,002,994 B2 * 8/2011 Engdahl ................. B01D 33/21 210/768
8,101,090 B2 * 1/2012 Ralvert .................. B01D 33/21 210/138
8,118,175 B2 * 2/2012 Davis ................... B01D 29/012 210/402
8,409,436 B2 * 4/2013 Danielsson ............ B01D 29/58 210/232
8,414,769 B2 * 4/2013 Servo ..................... B01D 33/23 210/330
D681,775 S * 5/2013 Bott ............................. D23/209
8,444,862 B2 * 5/2013 Ralvert .................. B01D 33/50 210/138
8,518,273 B2 * 8/2013 Lownertz ........... D21C 11/0064 210/402
8,628,661 B2 * 1/2014 Gaudfrin ................ B01D 33/23 210/232

(56) References Cited

U.S. PATENT DOCUMENTS 8,651,283 B2 * 2/2014 Altwies ........ B01D 33/23 210/493.1
8,801,929 B2 * 8/2014 Davis ........ B01D 33/70 210/345
8,808,542 B2 * 8/2014 Davis ........ B01D 33/21 210/345
8,852,434 B2 * 10/2014 Larsson ........ B01D 33/23 210/324
8,852,445 B2 * 10/2014 Xia ........ B01D 29/684 210/791
8,864,991 B2 * 10/2014 Larsson ........ B01D 33/23 210/486
8,961,785 B2 * 2/2015 Danielsson ........ B01D 33/215 210/232
9,023,208 B2 * 5/2015 Davis ........ B01D 29/012 210/345
9,028,692 B2 * 5/2015 Petit ........ B01D 33/21 210/345
9,259,674 B2 * 2/2016 Hammarberg ........ B01D 33/21
9,339,745 B2 * 5/2016 Davis ........ B01D 33/50
9,364,779 B2 * 6/2016 Rowe ........ D21C 9/06
9,468,874 B2 * 10/2016 Rantala ........ B01D 33/23
9,517,425 B2 * 12/2016 Nordfors ........ B01D 25/164
9,555,349 B2 * 1/2017 Hoefken ........ B01D 33/23
9,604,162 B2 * 3/2017 Hoefken ........ B01D 33/763
9,643,112 B2 * 5/2017 Rasmussen ........ B01D 33/23
9,669,338 B2 * 6/2017 Giasson ........ B01D 33/25
9,808,747 B2 * 11/2017 Massignani ........ B01D 33/466
9,968,875 B2 * 5/2018 Gabrielsson ........ B01D 35/28
10,005,213 B2 * 6/2018 Ralvert ........ B29C 55/02
10,188,971 B2 * 1/2019 Danielsson ........ B01D 33/215
10,207,210 B2 * 2/2019 Petit ........ B01D 33/11
10,220,335 B2 * 3/2019 Lee ........ B01D 33/23
10,220,336 B2 * 3/2019 Kotler ........ B01D 33/15
10,286,342 B2 * 5/2019 Illi ........ B01D 35/1435
10,589,201 B2 * 3/2020 Larsson ........ B01D 33/21
10,729,994 B2 * 8/2020 Svensson ........ C02F 1/001
10,814,282 B2 * 10/2020 Vänttinen ........ B01D 29/05
10,857,491 B2 * 12/2020 Braschi ........ B01D 33/067
10,888,807 B2 * 1/2021 Harden ........ B01D 33/21
10,905,981 B2 * 2/2021 Dannemann ........ B01D 35/10
10,913,016 B2 * 2/2021 Lee ........ B01D 33/23
11,000,791 B2 * 5/2021 Jibert ........ B01D 33/50
11,065,567 B2 * 7/2021 Gaudfrin ........ B01D 33/23
11,400,393 B2 * 8/2022 Dedul ........ B01D 29/41
11,478,731 B2 * 10/2022 Gabrielsson ........ D21G 9/00
11,504,655 B2 * 11/2022 Kuk ........ B01D 33/461
11,517,834 B2 * 12/2022 Moon ........ B01D 33/48
11,654,381 B2 * 5/2023 Kerl ........ B01D 33/23 210/323.1
11,660,552 B2 * 5/2023 Braschi ........ B01D 29/012 210/331
11,724,218 B2 * 8/2023 Kuk ........ B01D 33/21 210/391
12,048,890 B2 * 7/2024 Harden ........ B01D 33/39
12,115,476 B2 * 10/2024 Benesi ........ B01D 33/23
12,220,657 B2 * 2/2025 Whitlock ........ B01D 25/26
12,376,572 B2 * 8/2025 Chen ........ A01G 33/00
12,453,933 B2 * 10/2025 Faivre ........ B01D 33/463
12,478,903 B2 * 11/2025 Gabrielsson ........ B01D 33/21
12,564,803 B2 * 3/2026 Grabbe ........ B01D 33/21
2002/0153296 A1 * 10/2002 Servo ........ B01D 33/23 210/324
2002/0195388 A1 * 12/2002 Sierens ........ B01D 29/41 210/486
2004/0069702 A1 * 4/2004 Ekberg ........ B01D 33/23 210/486
2005/0000887 A1 * 1/2005 Scheucher ........ B01D 33/23 210/493.1
2005/0082217 A1 * 4/2005 Hagg ........ B01D 33/23 210/493.1
2005/0121381 A1 * 6/2005 Sheets ........ B01D 33/21 210/345
2005/0284805 A1 * 12/2005 Hognabba ........ B01D 63/087 210/231
2006/0260999 A1 * 11/2006 Danielsson ........ B01D 33/23 210/402
2006/0261001 A1 * 11/2006 Hagg ........ D21D 5/16 210/486
2007/0039869 A1 * 2/2007 Lovizzaro ........ B01D 33/23 210/486
2008/0035584 A1 * 2/2008 Petit ........ B01D 29/07 210/780
2009/0020483 A1 * 1/2009 Davis ........ B01D 33/70 210/489
2009/0020484 A1 * 1/2009 Davis ........ B01D 33/70 210/784
2009/0026152 A1 * 1/2009 Collins ........ B01D 39/02 210/791
2009/0114587 A1 * 5/2009 Kuo ........ B01D 63/084 210/346
2010/0012570 A1 * 1/2010 Danielsson ........ B01D 33/23 210/232
2010/0032364 A1 * 2/2010 Servo ........ B01D 33/23 210/486
2010/0282659 A1 * 11/2010 Gaudfrin ........ B01D 33/803 137/15.01
2011/0024347 A1 * 2/2011 Larsson ........ B01D 33/23 210/331
2011/0056883 A1 * 3/2011 Kerl ........ B01D 29/03 210/483
2011/0203989 A1 * 8/2011 Rantala ........ B01D 33/23 210/483
2012/0000842 A1 * 1/2012 Danielsson ........ B01D 33/215 210/232
2012/0012519 A1 * 1/2012 Altwies ........ B01D 33/23 210/493.1
2012/0103890 A1 * 5/2012 Larsson ........ B01D 33/23 210/232
2012/0298573 A1 * 11/2012 Davis ........ B01D 33/23 210/404
2013/0153486 A1 * 6/2013 Danielsson ........ B01D 29/58 210/330
2013/0186820 A1 * 7/2013 Tal ........ B01D 33/23 210/332
2013/0228506 A1 * 9/2013 Ralvert ........ B29C 45/14262 210/486
2013/0264270 A1 * 10/2013 Rasmussen ........ B01D 33/23 210/399
2013/0299408 A1 * 11/2013 Olenberg ........ B01D 33/21 210/345
2014/0197093 A1 * 7/2014 Gabrielsson ........ B01D 35/28 210/485
2014/0346104 A1 * 11/2014 Ekberg ........ B01D 24/4807 427/205
2014/0360950 A1 * 12/2014 Davis ........ B01D 29/012 210/330
2015/0008194 A1 * 1/2015 Davis ........ B01D 33/50 210/324
2015/0190740 A1 * 7/2015 Danielsson ........ B01D 33/215 210/236
2015/0224429 A1 * 8/2015 Massignani ........ B01D 33/463 210/247
2015/0246302 A1 * 9/2015 Petit ........ B01D 29/07 210/330
2015/0290564 A1 * 10/2015 Hoefken ........ B01D 33/067 210/331
2015/0290565 A1 * 10/2015 Hoefken ........ B01D 33/23 210/331
2015/0343347 A1 * 12/2015 Hindström ........ B01D 33/74 210/232
2016/0038857 A1 * 2/2016 Rantala ........ B01D 33/21 210/541
2016/0051911 A1 * 2/2016 Hayashi ........ B01D 29/413 210/483
2016/0074784 A1 * 3/2016 Illi ........ B01D 33/23 210/85
2016/0107108 A1 * 4/2016 Nordfors ........ B01D 33/23 29/428

(56) References Cited

U.S. PATENT DOCUMENTS

| | | | | |
|---|---|---|---|---|
| 2016/0121244 | A1* | 5/2016 | Ylisiurua | B01D 33/803 210/232 |
| 2016/0121245 | A1* | 5/2016 | Ekberg | B01D 35/06 427/127 |
| 2016/0193767 | A1* | 7/2016 | Ralvert | B29C 45/14262 264/257 |
| 2016/0263497 | A1* | 9/2016 | Giasson | B01D 33/803 |
| 2017/0043284 | A1* | 2/2017 | Petit | C02F 1/004 |
| 2017/0165597 | A1* | 6/2017 | Kotler | B01D 33/503 |
| 2017/0232367 | A1* | 8/2017 | Giasson | B01D 33/803 29/896.62 |
| 2018/0104880 | A1* | 4/2018 | Fukuda | B01D 29/0093 |
| 2018/0147509 | A1* | 5/2018 | Braschi | B01D 33/21 |
| 2018/0154291 | A1* | 6/2018 | Malo | B01D 33/23 |
| 2018/0214800 | A1* | 8/2018 | Gabrielsson | D21D 5/04 |
| 2018/0326357 | A1* | 11/2018 | Vänttinen | B01D 29/15 |
| 2018/0345184 | A1* | 12/2018 | Lee | B01D 33/23 |
| 2018/0369725 | A1* | 12/2018 | Gaudfrin | B01D 33/23 |
| 2019/0111364 | A1* | 4/2019 | Lee | B01D 33/23 |
| 2019/0224597 | A1* | 7/2019 | Harden | B01D 33/42 |
| 2020/0054974 | A1* | 2/2020 | Karaila | G01N 15/00 |
| 2020/0282345 | A1* | 9/2020 | Jibert | B01D 33/76 |
| 2021/0008473 | A1* | 1/2021 | Moon | B01D 33/503 |
| 2021/0046407 | A1* | 2/2021 | Dedul | B01D 29/413 |
| 2021/0129059 | A1* | 5/2021 | Harden | B01D 36/04 |
| 2021/0138368 | A1* | 5/2021 | Braschi | B01D 29/012 |
| 2021/0170310 | A1* | 6/2021 | Kotler | B01D 33/21 |
| 2022/0001311 | A1* | 1/2022 | Kerl | B01D 33/23 |
| 2022/0161164 | A1* | 5/2022 | Persson | B01D 33/21 |
| 2022/0347603 | A1* | 11/2022 | Whitlock | B01D 25/26 |
| 2022/0379246 | A1* | 12/2022 | Dedul | B01D 25/26 |
| 2023/0110055 | A1* | 4/2023 | Gabrielsson | B01D 33/21 210/330 |
| 2023/0338880 | A1* | 10/2023 | Harden | B01D 33/50 |
| 2023/0356120 | A1* | 11/2023 | Kerl | B01D 33/23 |
| 2024/0091684 | A1* | 3/2024 | Egger | B01D 33/23 |
| 2024/0123384 | A1* | 4/2024 | Berchman | B01D 33/23 |
| 2024/0189745 | A1* | 6/2024 | Laakso | B01D 33/23 |
| 2025/0262576 | A1* | 8/2025 | Schneider | B01D 46/0005 |
| 2026/0091330 | A1* | 4/2026 | Kerl | B01D 33/23 |

FOREIGN PATENT DOCUMENTS

| | | | | |
|---|---|---|---|---|
| DE | 102011085817 | A1 * | 5/2013 | D21D 5/046 |
| DE | 202011110505 | U1 * | 5/2014 | B01D 33/23 |
| EP | 4382186 | A1 * | 6/2024 | B01D 33/23 |
| EP | 4382186 | B1 * | 3/2025 | B01D 33/21 |

* cited by examiner

FILTER SECTOR ASSEMBLY OF A DISC FILTER

CROSS REFERENCES TO RELATED APPLICATIONS

This application claims priority on FI 20226090, filed Dec. 9, 2022, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to filter sectors for filtering fluid and solid mixtures, especially in connection with pulp and fiber web production.

As known from the prior art in fiber web machines, especially in paper and board machines, the fiber web is produced and treated in an assembly formed by a number of apparatuses arranged consecutively in a process line. A typical production and treatment line comprises a forming section comprising a head box and a forming unit and a press section as well as a subsequent drying section and a reel-up. The production and treatment line can further comprise other devices and sections for finishing the fiber web, for example, a size press, a calender, a coating section. The production and treatment line also comprises typically at least one winder for forming customer rolls as well as a roll packaging apparatus.

Before the head box fiber suspensions comprising recycled and/or virgin fibers are treated to be fed into the head box to be used to produce the fiber webs. A treatment system of the pulp suspensions for example comprises a pulping section, a deashing system, a detrashing system, a coarse filtering section, a centrifugal cleaning section, a fractionation section, a fine filtering system, a fiber thickening system and fiber refining systems.

The term "fiber suspensions" means liquids and suspensions, which contain fibers and other occurring ingredients, which are meant to be filtered out. The fibers usually mean recycled cellulose fibers, but also newly produced cellulose fibers can come into question.

It is known from the prior art that different types of disc filters are used to separate liquid from the fiber suspensions. A disc filter typically comprises a fiber suspension containing bath, often referred as a vat, and a, typically tubular, core assembly adapted to rotate on a horizontal axis, and a plurality of filter sectors spaced along the core assembly and supported on the core assembly.

In respect of operation of the disc filter it is important that the filter sectors are properly supported and attached to the core assembly. Occasionally, there might be disturbances in operation of one or more of the filter sectors and a filter sector may also break. Thus, it is also important that the filter sectors are easy to maintain and can be easily replaced. In some known arrangements for filter sectors of disc filters, the maintaining and/or replacing of the filter sectors takes a rather long time, during which the disc filter cannot be operated.

An object of the invention is to create a filter sector assembly in which the disadvantages and problems of prior art are eliminated or at least minimized.

In particular an object of the invention is to create an improved filter sector assembly, in particular in respect of reliable support of the filter sector to the core assembly.

In particular another object of the invention is to create an improved filter sector assembly, in particular in respect of maintenance of the filter sector.

In particular another object of the invention is to create an improved filter sector assembly, in particular in respect of replaceability of the filter sector to the core assembly.

SUMMARY OF THE INVENTION

According to the invention the filter sector assembly of a disc filter, which disc filter comprises a fiber suspension containing bath, a filter sector assembly rotatably supported with relation to the bath, a core assembly adapted to rotate on a horizontal axis, and a plurality of filter sectors spaced along the core assembly and supported on the core assembly, comprises two adjacent filter sectors and a support plate, and the two adjacent filter sectors are attached as a pair of filter sectors by the support plate to the core assembly of the disc filter.

According to an advantageous feature of the invention the support plate comprises re-openable and re-fastenable attachment means configured to provide fastening between the filter sectors of the filter sector assembly and the core assembly of the disc filter.

According to an advantageous feature of the invention a plurality of the filter sector assemblies, each formed of two adjacent filter sectors supported on the same support plate, are attached on the core assembly of the disc filter.

According to an advantageous feature of the invention at each outer side of the two adjacent filter sectors supported on the same support plate a vertical reinforcing rib is located configured to give further vertical support and sturdiness to the filter sector assembly.

According to an advantageous feature of the invention between the two adjacent filter sectors supported on the same support plate in the filter assembly of the pair of the two adjacent filter sectors a spacer plate is located configured to ensure correct distance between the two adjacent filter sectors of the filter assembly.

According to an advantageous feature of the invention along the top ends of the filter sectors a retainer ring is attached to fasten the top ends of the filter sectors to each other.

According to an advantageous feature of the invention each filter sector comprises a filtering part and, around the filtering part mount frame parts configured to support the filtering part of the filter sector.

According to an advantageous feature of the invention each filter sector comprises a funnel part mounted on the bottom end of the filter sector configured to support and mount the filter sector.

According to an advantageous feature of the invention the funnel part comprises a sector shaped base part and the bottom end of the base part is attached to a support panel and on each side of the base part a side panel is located and configured to provide robustness to the funnel part.

According to an advantageous feature of the invention the support panels of the funnel parts of two adjacent filter sectors are attached to the same support plate, which attach the filter sector assembly formed of the two adjacent filter sectors to the core assembly.

The term "fiber suspensions" means liquids and suspensions, which contain fibers and other occurring ingredients, which are meant to be filtered out. The fibers usually mean recycled cellulose fibers, but also newly produced cellulose fibers can come into question. In this description and the claims, the terms "top" and "bottom" are to be interpreted in view of the disc filter, such that the top indicates the outer part of the disc filter and the bottom indicates the inner part of the disc filter.

By the invention and its advantageous features several advantages are achieved: Reliable support of the filter sectors to the core assembly is achieved by the sturdy support plate supporting two adjacent filter sectors. The attachment means of the support plate provides easy and fast replacing of the filter sectors and easy maintenance of the filter sectors. Thus, also higher strength of the filter sectors during operation of the disc filter is achieved and furthermore better safety for operators is provided.

BRIEF DESCRIPTION OF THE DRAWINGS

Aspects of the invention, however, together with additional objects and advantages thereof, will be best understood from the following description of some example embodiments when read in connection with the accompanying drawings and in the following the invention is described in more detail referring to the accompanying drawing.

DESCRIPTION OF THE PREFERRED EMBODIMENTS

During the course of this description like numbers and signs will be used to identify like elements according to the different views which illustrate the invention. Repetition of some reference signs may have been omitted in the figures for clarity reasons.

Figure 1:
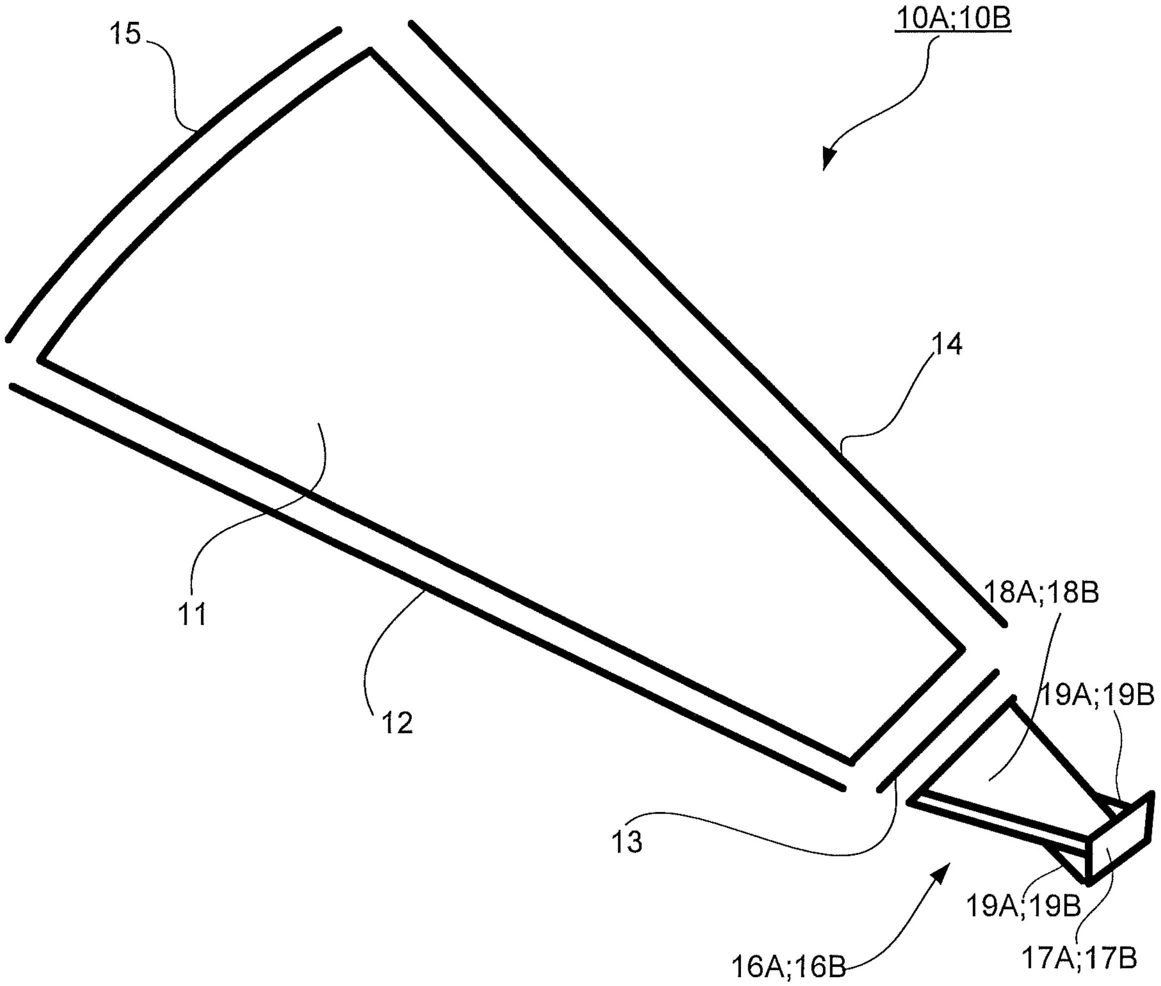
FIG. 1 schematically shows an advantageous example of a filter sector as a schematical assembly drawing.

FIG. 1 schematically shows an example of a filter sector 10A; 10B comprising a filtering part 11, which is sector shaped. Around the filtering part 11 frame parts 12, 13, 14, 15 are located to be mounted around the filtering part 11 to support the filtering part 11 of the filter sector 10A, 10B. The frame parts comprise two side support bars 12, 14, a bottom support bar 13 and a slightly curved top support bar 15. The filter sector 10A; 10B also comprises a funnel part 16A; 16B, which is to be mounted on the bottom end of the filter sector 10A; 10B to support and to mount the filter sector 10A; 10B. The funnel part 16A; 16B comprises a sector shaped base part 18A; 18B. The bottom end of the base part 18A; 18B is attached to a support panel 17A; 17B, which is substantially rectangular. On each side of the base part 18A, 18B a side panel 19A; 19B is located to provide robustness to the funnel part 16A; 16B.

Figure 2:
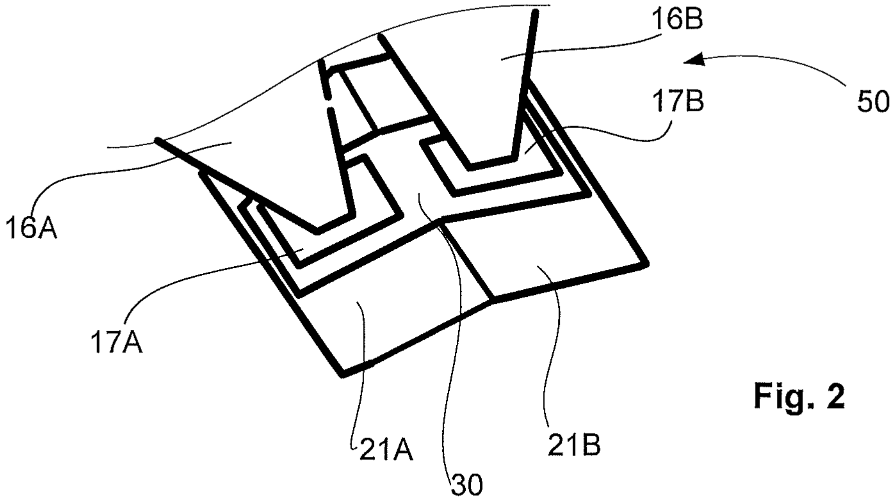
FIG. 2 very schematically shows an advantageous example of fastening of two adjacent filter sectors by a support plate of a filter sector assembly according to the invention.
Figure 4:
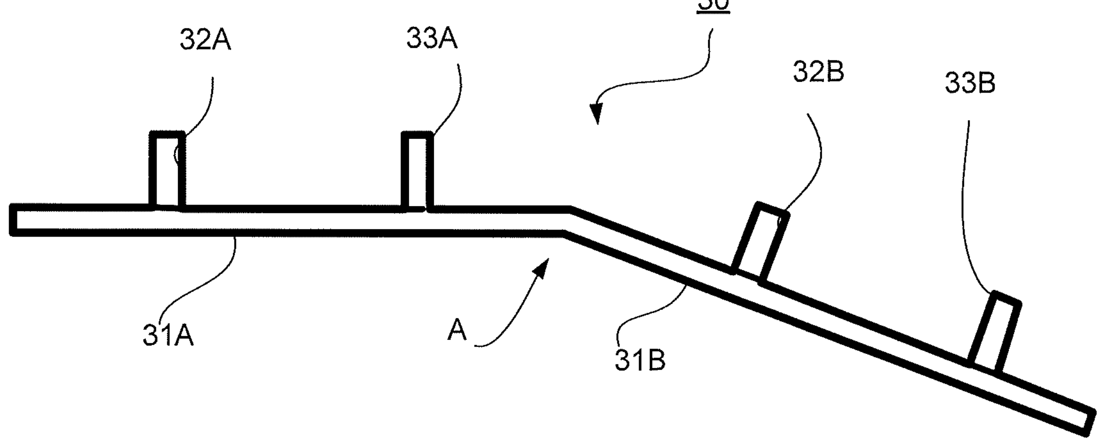
FIG. 4 very schematically shows an advantageous example of a support plate of a filter sector assembly according to the invention.

In FIG. 2 is very schematically shown an advantageous example of fastening of two adjacent filter sectors 10A, 10B by a support plate 30 of a filter sector assembly 50 formed of two adjacent filter sectors 10A, 10B. In FIG. 2 only funnel parts 16A,16B with support panels 17A, 17B, correspondingly, of two adjacent filter sectors 10A, 10B are shown. The support panels 17A, 17B of the funnel parts 16A, 16 of two adjacent filter sectors 10A, 10B are attached to the support plate 30, which attaches the two adjacent filter sectors 10A, 10B to the outer surface parts 21A, 21B of a tubular core of a core assembly of a disc filter. In this example the tubular core of the core assembly of the disc filter is formed of an angular structure. The support panels 17A, 17B of the funnel parts 16A, 16 of two adjacent filter sectors 10A, 10B are attached to the support plate 30 by re-openable and re-fastenable attachment means such removable fasteners such as screws 32A, 33A, 32B, 33B (FIG. 4). The funnel parts 16A, 16B have respective attachment openings for the attachment means 32A, 33A, 32B, 33B (FIG. 4). In FIG. 2 only two of the filter sectors 10A, 10B are shown, but it is to be understood that advantageously all filter sectors of the disc filter are attached as pairs of two adjacent filter sectors 10A, 10B by support plates 30 around the outer surface of the disc filter by re-openable and re-fastenable attachment means (not shown). The disc filter comprises a plurality of filter sector assemblies 50, each formed of two adjacent filter sectors 10A, 10B supported on the same support plate 30. Thus, reliable support of the two adjacent filter sectors 10A, 10B to the core assembly is achieved by the sturdy support plate 30 supporting the two adjacent filter sectors 10A, 10B. The re-openable and re-fastenable attachment means 32A, 33A, 32B, 33B of the support plate 30 provide easy and fast replacing of the filter sectors 10A, 10B and easy maintenance of the filter sectors 10A, 10B. Thus, also higher strength of the filter sectors 10A, 10B during operation of the disc filter is achieved and, in addition, better safety for operators is provided.

Figure 3:
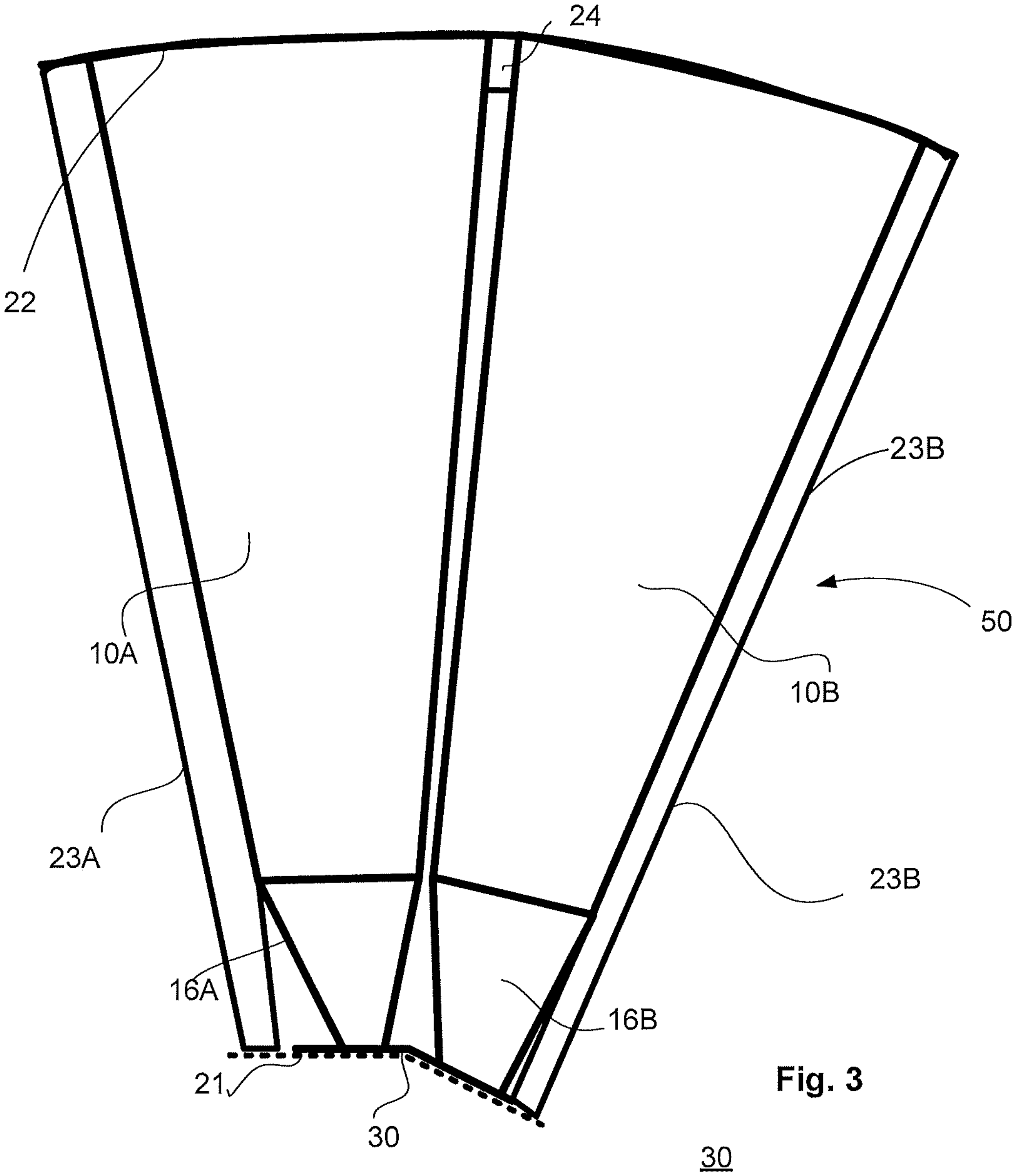
FIG. 3 very schematically shows another advantageous example of fastening of two adjacent filter sectors by a support plate of a filter sector assembly according to the invention.

In FIG. 3 is very schematically shown another advantageous example of fastening of two adjacent filter sectors 10A, 10B by a support plate 30 of a filter sector assembly 50 formed of two adjacent filter sectors 10A, 10B. In FIG. 2 only funnel parts 16A, 16B, correspondingly, of two adjacent filter sectors 10A, 10B are shown. As shown in FIG. 3 the funnel parts 16A, 16B of two adjacent filter sectors 10A, 10B are attached to the support plate 30, which attaches the two adjacent filter sectors 10A, 10B to the outer surface 21 of the tubular core of the core assembly of the disc filter. In this example the tubular core of the core assembly of the disc filter is formed of an angular structure. The funnel parts 16A, 16B of two adjacent filter sectors 10A, 10B are attached to the support plate 30 by re-openable and re-fastenable attachment means such as screws 32A, 33A, 32B, 33B (FIG. 4). The funnel parts 16A, 16B have respective attachment openings for the attachment means 32A, 33A, 32B, 33B (FIG. 4). In FIG. 3 only two of the filter sectors 10A, 10B are shown, but it is to be understood that advantageously all filter sectors of the disc filter are attached as pairs of two adjacent filter sectors 10A, 10B by the support plates 30 around the outer surface of the disc filter by re-openable and re-fastenable attachment means (not shown). The disc filter comprises a plurality of filter sector assemblies 50, each formed of two adjacent filter sectors 10A, 10B supported on the same support plate 30. Between the two adjacent filter sector 10A, 10B in the filter assembly of the pair of the two adjacent filter sectors 10A, 10B a spacer plate 24 can be located to ensure the correct distance between the two adjacent filter sectors 10A, 10B. At each outer side of the two adjacent filter sectors 10A, 10B a vertical reinforcing rib 23A, 23B is located to give further vertical support and sturdiness to the filter sector assembly 50. Also, along the top ends of the filter sectors 10A, 10B a retainer ring 22 is attached to fasten the top ends of the filter sectors 10A, 10B to each other and the top ends of the filter sectors 10A, 10B of the filter sector assemblies 50 of the disc filter to each other. Thus, reliable support of the two adjacent filter sectors 10A, 10B to the core assembly is achieved by the sturdy support plate 30 supporting the two adjacent filter sectors 10A, 10B. The re-openable and re-fastenable attachment means 32A, 33A, 32B, 33B of the support plate 30 provide easy and fast replacing of the filter sectors 10A, 10B and easy maintenance of the filter sectors 10A, 10B. Thus, also higher strength of the filter sectors 10A, 10B during operation of the disc filter are achieved and furthermore better safety for operators is provided.

In FIG. 4 is very schematically shown an advantageous example of a support plate 30 of a filter sector assembly 50. One support plate 30 is used to attach two adjacent filter sectors 10A, 10B (such as shown in FIGS. 2-3) to the outer surface of the core assembly of the disc filter. The support plate 30 comprises re-openable and re-fastenable attachment means such as screws 32A, 33A, 32B, 33B to provide fastening between the support panels 17A, 17B of the funnel parts 16A, 16B of the filter sectors 10A, 10B of the filter sector assembly 50 and the core assembly of the disc filter. In FIG. 4 the support plate 30 is shown as a side view and it is to be understood that there may be more than one re-openable and re-fastenable attachment means such as screws 32A, 33A, 32B, 33B in the depth direction of FIG. 4. The support plate 30 of the example of FIG. 4 is provided for an angular outer surface of the tubular core of the core assembly and thus it comprises sections 31A, 31B disposed with respect to each other at an angle A corresponding with the outer surface angles of the tubular core of the core assembly or in an angle A slightly degrees less than the angles of the tubular core of the core assembly.

In the description in the foregoing, although some functions have been described with reference to certain features, those functions may be performable by other features whether described or not. Although features have been described with reference to certain embodiments or examples, those features may also be present in other embodiments or examples whether described or not. Above the invention has been described by referring to some advantageous examples only to which the invention is not to be narrowly limited. Many modifications and alterations are possible within the invention as defined in the following claims.

I claim:

1. A filter sector assembly (50) comprising:

an angled support plate (30) for attachment to a rotatable tubular core assembly (21) of a disc filter, the rotatable tubular core assembly defining a filtrate receiving interior and including an angular structure with planar outer surface parts (21A, 21B), the angled support plate (30) having a first portion (31A) and an opposing second portion (31B) angled relative to the first portion (31A), the angled support plate (30) being shaped to matingly conform to the shape of the angular structure to engage the planar outer surface parts (21A, 21B), the angled support plate (30) including re-openable and refastenable fasteners (32A, 33A, 32B, 33B); a first filter sector (10A) including a first frame assembly about a first filtering part (11), and a first funnel section (16A) including a first support panel (17A), for funneling filtrate to the interior of the rotatable tubular core assembly (21);

a second filter sector (10B) including a second frame assembly about a second filtering part, and a second funnel section (16B) including a second support panel (17B), for funneling filtrate to the interior of the rotatable tubular core assembly (21);

wherein the first and second funnel sections (16A, 16B) each have respective attachment openings for receiving the re-openable and refastenable fasteners (32A, 33A, 32B, 33B);

wherein the first filter sector (10A) and the second filter sector (10B) are arranged adjacent to each other, the two adjacent filter sectors (10A, 10B) are both releasably fixed to the angled support plate (30) as a single unit by affixing the first support panel (17A) to the first portion (31A) and affixing the second support panel (17B) to the second portion (31B).

2. The filter sector assembly of claim 1, wherein the first filter sector has a first outer side, and wherein the second filter sector has a second outer side, and further comprising:

a first vertical reinforcing rib (23A) connected to the first filter sector first outer side; a second vertical reinforcing rib (23B) connected to the second filter sector second outer side, the first vertical reinforcing rib and the second vertical reinforcing rib being configured to give further vertical support and sturdiness to the filter sector assembly.

3. The filter sector assembly of claim 1 further comprising a spacer plate (24) positioned between the first filter sector and the second filter sector to ensure a correct distance therebetween.

4. The filter sector assembly of claim 1 further comprising a retainer ring (22) attached along top ends of the first filter sector and the second filter sector to fasten the top ends to each other.

5. The filter sector assembly of claim 1 wherein each of the first and second frames comprises a plurality of frame parts (12, 13, 14, 15).

6. The filter sector assembly of claim 1 wherein each funnel section (16A, 16B) comprises a sector shaped base part (18A, 18B) having a bottom end which is attached to the support panel (17A, 17B) and further comprising a side panel (19A, 19B) on opposite sides of the base part.

7. A disc filter comprising:

a rotatable tubular core assembly defining a filtrate receiving interior and including an angular structure with planar outer surface parts (21A, 21B), adapted to rotate on a horizontal axis; and a plurality of filter sector assemblies (50) mounted on the rotatable tubular core assembly, each filter sector assembly comprising:

an angled support plate (30) attached to the rotatable tubular core assembly (21), the angled support plate (30) having a first portion (31A) and an opposing second portion (31B) angled relative to the first portion (31A), the angled support plate (30) being shaped to matingly conform to the shape of the angular structure and being engaged with the planar outer surface parts (21A, 21B), the angled support plate (30) including re-openable and refastenable attachment means (32A, 33A, 32B, 33B);

a first filter sector (10A) including a first frame assembly about a first filtering part (11), and a first funnel section (16A) including a first support panel (17A), for funneling filtrate to the interior of the rotatable tubular core assembly (21);

a second filter sector (10B) including a second frame assembly about a second filtering part, and a second funnel section (16B) including a second support panel (17B), for funneling filtrate to the interior of the rotatable tubular core assembly (21);

wherein the first and second funnel sections (16A, 16B) each have respective attachment openings for receiving the re-openable and refastenable attachment means (32A, 33A, 32B, 33B);

wherein the first filter sector (10A) and the second filter sector (10B) are arranged adjacent to each other, the two adjacent filter sectors (10A, 10B) are both releasably fixed to the angled support plate (30) as a single unit by affixing the first support panel (17A) to the first portion (31A) and affixing the second support panel (17B) to the second portion (31B).

8. The disc filter of claim 7, wherein, the plurality of planar outer surface parts, are connected to each other at a first angle which is greater than 90 degrees.

9. The disc filter of claim 7, wherein, the plurality of filter sector assemblies (50) extend around the rotatable tubular core assembly.

10. The disc filter of claim 7, wherein, the plurality of filter sector assemblies (50) extend along the length of the rotatable tubular core assembly.

11. The disc filter of claim 7, wherein, the plurality of filter sector assemblies (50) are at least partially disposed in a vat.

12. A disc filter comprising:

a rotatable tubular core assembly defining a filtrate receiving interior and including an angular structure with planar outer surface parts (21A, 21B), adapted to rotate on a horizontal axis; and a plurality of filter sector assemblies (50) mounted on the rotatable tubular core assembly, each filter sector assembly comprising:

an angled support plate (30) attached to the rotatable tubular core assembly (21), the angled support plate (30) having a first portion (31A) and an opposing second portion (31B) angled relative to the first portion (31A), the angled support plate (30) being shaped to matingly conform to the shape of the angular structure and being engaged with the planar outer surface parts (21A, 21B), the angled support plate (30) including re-openable and refastenable fasteners (32A, 33A, 32B, 33B);

a first filter sector (10A) including a first frame assembly about a first filtering part (11), and a first funnel section (16A) including a first support panel (17A), for funneling filtrate to the interior of the rotatable tubular core assembly (21);

a second filter sector (10B) including a second frame assembly about a second filtering part, and a second funnel section (16B) including a second support panel (17B), for funneling filtrate to the interior of the rotatable tubular core assembly (21);

wherein the first and second funnel sections (16A, 16B) each have respective attachment openings for receiving the re-openable and refastenable fasteners (32A, 33A, 32B, 33B);

wherein the first filter sector (10A) and the second filter sector (10B) are arranged adjacent to each other, the two adjacent filter sectors (10A, 10B) are both releasably fixed to the angled support plate (30) as a single unit by affixing the first support panel (17A) to the first portion (31A) and affixing the second support panel (17B) to the second portion (31B).

* * * * *